(12) United States Patent
Van Dreumel

(10) Patent No.: US 6,256,948 B1
(45) Date of Patent: Jul. 10, 2001

(54) FIRE-RESISTANT PASSAGE FOR LINES

(75) Inventor: André Van Dreumel, c/o Vierhavenstraat 1-7, 3029 BB Rotterdam (NL)

(73) Assignees: Andre Van Dreumel; Dagfinn Nilsen, both of Rotterdam (NL)

( * ) Notice: Subject to any disclaimer, the term of this patent is extended or adjusted under 35 U.S.C. 154(b) by 0 days.

(21) Appl. No.: 09/418,408

(22) Filed: Oct. 14, 1999

(30) Foreign Application Priority Data

Oct. 16, 1998 (NL) .................................................... 1010334
Feb. 2, 1999 (NL) .................................................... 1011190

(51) Int. Cl.$^7$ ................................. E04C 2/52; E04C 2/02
(52) U.S. Cl. ............................................. 52/220.8; 52/232
(58) Field of Search ..................................... 52/220.8, 232

(56) References Cited

U.S. PATENT DOCUMENTS

| | | | |
|---|---|---|---|
| 4,245,445 | * 1/1981 | Heinen | 52/220.8 |
| 4,740,404 | * 4/1988 | Otsugu et al. | 52/232 X |
| 5,194,192 | * 3/1993 | Seebode | 52/232 X |
| 5,344,106 | * 9/1994 | Beele | 52/220.8 X |

* cited by examiner

Primary Examiner—Christopher T. Kent
(74) Attorney, Agent, or Firm—Howard & Howard

(57) ABSTRACT

Fire-resistant passage for one or more lines, such as cables or tubes, in a wall, including an opening in the wall, one or more lines extending through the opening from the one side of the wall to the other side thereof, and a number of profile sections made from material which expands under the influence of heat, which profile sections are situated adjacent to the lines in order to support them and to occupy the surface of the opening present adjacent to the lines, the profile sections having such a shape that radially they freely abut the lines concerned.

21 Claims, 1 Drawing Sheet

FIRE-RESISTANT PASSAGE FOR LINES

BACKGROUND OF THE INVENTION

The invention relates to a fire-resistant passage for one or more lines, such as cables or tubes/pipes, in a wall. Such a wall can be present in ships, and surround a space there which in case of a fire at the other side of said wall has to be protected against said fire.

Such fire-resistant passage systems are known from many patent documents. U.S. Pat. Nos. 4,702,444, 4,712,342, 4,061,344, 4,219,173 and 4,424,867 are mentioned.

In particular European patent application 0,534,563 is referred to, from which a fire-resistant system is known with a wall opening and a series of sleeves filling said wall opening, which sleeves are made from a synthetic rubber-like material referred to as FRR/LEHF.

This material expands under the influence of heat in order to fill the openings that are present between the tubes and in the empty tubes, so that after that a closed barrier is formed against fire and the passage through the wall does not form a possible fire leak.

The sleeves are provided with a longitudinal interruption in order to be placed easily around a cable or line to envelop them. For each diameter range of cable or pipe a rubber sleeve of a certain diameter is available. In the placed situation there is a group of sleeves of varying diameter, in some of which a pipe or cable is then led through. The end plane of the sleeves is then sealed off with the help of a fire-resistant gas and water-proof putty.

When it desired to lead through a further cable or pipe the putty is removed and the cable or pipe concerned is led through an accompanying still empty sleeve.

A drawback of said known system is that one has to think beforehand about which sleeves have to be placed, in connection with to the expectations about the cables and pipes to be led through now and in the future. Furthermore sleeves of varying diameters have to be at one's disposal, which requires additional effort and space as regards the stock control.

OBJECTS OF THE INVENTION

The invention has the object to improve on this, and to that end from one aspect provides a fire-resistant passage for one or more lines, such as cables or tubes, in a wall, comprising an opening in the wall, one or more lines extending through the opening from the one side of the wall to the other side thereof, and a number of profile sections made from material which expands under the influence of heat, which profile sections are situated adjacent to the lines in order to support them and to occupy the surface of the opening present adjacent to the lines, the profile sections having such a shape that radially they freely abut the lines concerned.

From another aspect the invention provides a fire-resistant passage for one or more lines, such as cables or tubes, in a wall, comprising an opening in the wall, one or more lines extending through the opening from the one side of the wall to the other side thereof, and a number of profile sections made from material which expands under the influence of heat, which profile sections are situated adjacent to the lines in order to support them and to occupy the surface of the opening present adjacent to the lines, the profile sections all being arranged free of suspension from the lines, or either loose from the lines.

With the measures according to the invention it is achieved that when a cable or pipe has to be added in the passage simply one or several profile sections can be removed in order to thus provide space for said cable or pipe. It will not be necessary any more then to have a sleeve with a specific suitable diameter for the cable or pipe to be led through at one's disposal in the passage beforehand.

The solution according to the invention makes it possible to let the profile sections be identical: after all they no longer have a (direct) dimensional relation with the cables and pipes to be led through.

Preferably the profile sections are each formed with an open passage situated outside of the lines. Said passage forms a longitudinally extending air chamber between both ends of the passage, which will be sealed off by putty in the usual manner. Said air chamber increases the initial resistance and retardation against heat transport through the passage, until the moment on which the heat has penetrated the profile section to such an extent that also the boundaries of the passage in the profile sections will expand toward each other.

Preferably the passage is circumferentially bounded by a circumferentially closed wall, as a result of which the initial insulating action will be increased.

Preferably the profile sections can be pressed in, so that in stacked situation they themselves are compliant under the influence of the weight of the lines situated above them, as a result of which a high filling degree can be achieved without undoing the advantageous aspects of the invention.

Preferably the profile sections are provided with transverse protrusions extending in profile section direction, which preferably are compliant. With little material, support is given by such protrusions, to lines that are possibly placed over it.

From another aspect the invention relates to a set of profile sections, suitable and destined for use in the fire-resistant passage according to the invention.

BRIEF DESCRIPTION OF THE DRAWINGS

The invention will be elucidated on the basis of an exemplary embodiment shown in the attached drawing, in which.

DETAILED DESCRIPTION OF THE INVENTION

Figure 1:
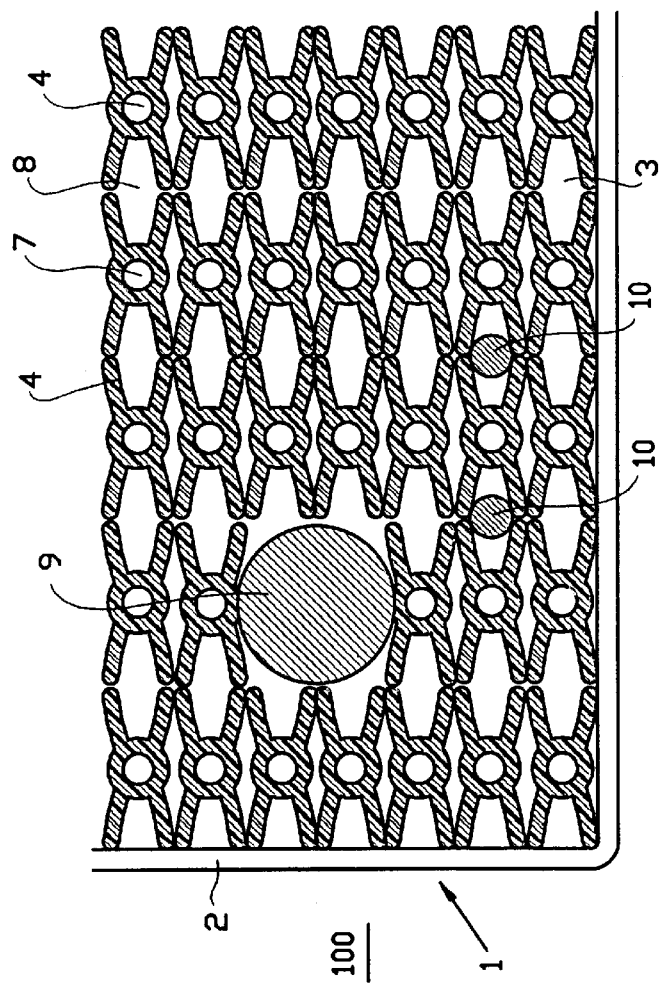
FIG. 1 shows a part of a rectangular passage for lines in a wall, in which profile sections according to the invention are placed.

The passage 1 in FIG. 1 is arranged in a wall 100, an upstanding wall here, but it could also be a floor or a ceiling, and comprises a rectangular opening which is bounded by a sleeve wall 12. In the opening 3 a series of profile sections 4 is stacked, which, as can be seen in FIG. 2, are substantially star-shaped with a centrally situated, cylindrical narrow duct 5, which defines a passage 7 and with a number of radially protruding rib strips 6a–6d.

The profile section is made of a material which is compliant and expands under the influence of heat, in this example thermoplastic elastomer. The rib strips 6a–6d can be bent toward each other, for instance in the directions A.

Figure 2:
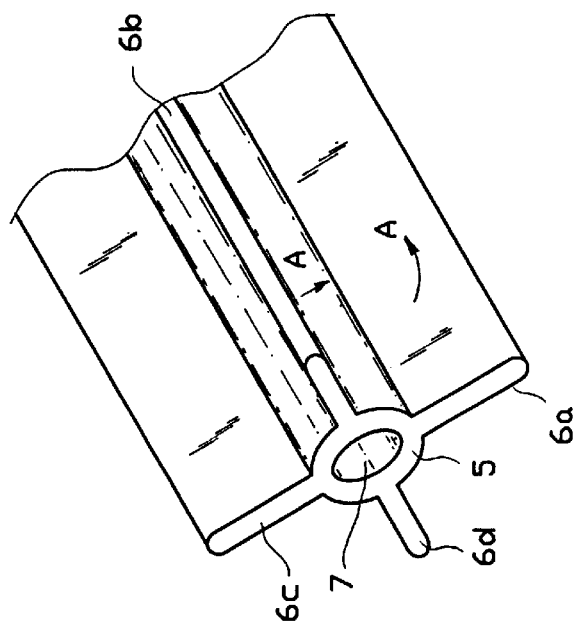
FIG. 2 shows a part of a profile section according to the invention used in the passage of FIG. 1.

Thus the profile sections 4 placed in the arrangement in FIG. 1 are deformed under the influence of gravity from the star-shape of FIG. 2 into a more flat shape. They rest with the rib strips on each other, and they could also possibly rest with the ducts 5 on each other. When the weight forces are high the ducts 5 themselves could also possibly deform, though because of the ring-shape a passage of some size will remain. In an alternative arrangement the profile sections lie in subsequent horizontal rows offset with respect to each other.

In this example three cables are placed in the passage 1, namely a thick cable 9 and two slim cables 10.

In case of fire the TPE material of the profile sections 4 will expand and entirely fill the spaces 8 and abut the surface of the cables 9 and 10 and adjacent profile sections. After a while the passages 7 will also be closed. Thus a sealing is obtained against fire, but also against water, which moreover is pressure proof, also because the profile sections press against each other and against the boundaries of the opening 3 as a result of the expansion.

When it is desired to lead an additional cable or pipe through, first the water sealing putty which is applied at the ends of the opening 3 is removed. Subsequently one of the profile sections 4 is taken by the fingers or by a suitable tool and it is pulled simply out of the stack of profile sections. If necessary another profile section is removed. After that the cable or pipe concerned which is yet to be placed can be inserted in a simple manner.

It is also possible, for instance after the cable 9 has been removed, to fill the remaining gap, possibly after mutual subsidence of the profile sections 4, with identical new profile sections 4 which are kept in stock.

What is claimed is:

1. A fire-resistant passage for one or more lines in a wall, comprising an opening in said wall, one or more lines extending through said opening from a first side of said wall to a second side thereof, and a number of profile sections made from material which expands under the influence of heat, said profile sections situated beside and not coaxial to said lines in order to support said lines and to occupy only the portion of said opening present adjacent to said lines, said profile sections having a shape that radially freely abuts said lines.

2. The fire-resistant passage according to claim 1, wherein said profile sections each are formed with an open passage situated outside of said lines.

3. The fire-resistant passage according to claim 2, wherein said open passage is circumferentially bounded by a circumferentially closed wall.

4. The fire-resistant passage according to claim 1, wherein said profile sections can be pressed in.

5. The fire-resistant passage according to claim 4, wherein said profile sections are provided with transverse protrusions extending along said profile section.

6. The fire-resistant passage according to claim 5, wherein said protrusions are compliant.

7. The fire-resistant passage according to claim 5, wherein said protrusions are formed as strips.

8. The fire-resistant passage according to claim 1, wherein said profile sections have a cross-shaped or star-shaped appearance in an unloaded situation.

9. The fire-resistant passage according to claim 1, wherein all of said profile sections are identical.

10. The fire-resistant passage according to claim 1, wherein said profile sections are manufactured from a thermoplastic elastomer.

11. The fire-resistant passage according to claim 1, comprising several lines of different diameters.

12. A fire-resistant passage for one or more lines in a wall, comprising an opening in said wall, one or more lines extending through said opening from a first side of said wall to a second side thereof, and a number of profile sections made from material which expands under the influence of heat, said profile sections situated beside and not coaxial to said lines in order to support said lines and to occupy only the portion of said opening present adjacent to said lines, said profile sections all being arranged free of suspension from said lines.

13. The fire-resistant passage according to claim 12, wherein said profile sections each are formed with an open passage situated outside of said lines.

14. The fire-resistant passage according to claim 13, wherein said open passage is circumferentially bounded by a circumferentially closed wall.

15. The fire-resistant passage according to claim 12, wherein said profile sections can be pressed in.

16. The fire-resistant passage according to claim 15, wherein said profile sections are provided with transverse protrusions extending along said profile section.

17. The fire-resistant passage according to claim 16, wherein said protrusions are compliant.

18. The fire-resistant passage according to claim 16, wherein said protrusions are formed as strips.

19. The fire-resistant passage according to claim 12, wherein said profile sections have a cross-shaped or star-shaped appearance in an unloaded situation.

20. The fire-resistant passage according to claim 12, wherein all of said profile sections are identical.

21. The fire-resistant passage according to claim 12, wherein said profile sections are manufactured from a thermoplastic elastomer.

* * * * *